US012757230B2

(12) United States Patent
Jia et al.

(10) Patent No.: US 12,757,230 B2
(45) Date of Patent: Oct. 6, 2026

(54) RELIABLE FRAME TRANSMISSION SCHEME FOR MULTI-LINK DEVICE

(71) Applicant: HEWLETT PACKARD ENTERPRISE DEVELOPMENT LP, Spring, TX (US)

(72) Inventors: Xuguang Jia, Beijing (CN); Zhenlei Wang, Beijing (CN); Xiaoyang Fu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 354 days.

(21) Appl. No.: 18/408,881

(22) Filed: Jan. 10, 2024

(65) Prior Publication Data

US 2025/0227733 A1 Jul. 10, 2025

(51) Int. Cl.

| | |
|---|---|
| ***H04W 72/30*** | (2023.01) |
| ***H04W 12/03*** | (2021.01) |
| ***H04W 12/04*** | (2021.01) |
| ***H04W 72/52*** | (2023.01) |
| ***H04W 84/12*** | (2009.01) |

(52) U.S. Cl.
CPC ........... *H04W 72/30* (2023.01); *H04W 12/03* (2021.01); *H04W 12/04* (2013.01); *H04W 72/52* (2023.01); *H04W 84/12* (2013.01)

(58) Field of Classification Search
None
See application file for complete search history.

(56) References Cited

U.S. PATENT DOCUMENTS

| | | | | |
|---|---|---|---|---|
| 11,838,788 | B2 * | 12/2023 | Kwon | H04W 28/0268 |
| 11,864,045 | B2 * | 1/2024 | Patil | H04W 76/28 |
| 2011/0096712 | A1 * | 4/2011 | Kish | H04L 45/16 370/312 |
| 2012/0106547 | A1 * | 5/2012 | Janakiraman | H04B 7/155 370/390 |
| 2015/0117235 | A1 * | 4/2015 | Bhanage | H04L 12/185 370/252 |
| 2020/0396568 | A1 * | 12/2020 | Huang | H04W 76/40 |
| 2021/0266891 | A1 * | 8/2021 | Chu | H04L 5/1469 |
| 2021/0266998 | A1 * | 8/2021 | Ho | H04W 48/12 |
| 2021/0282229 | A1 * | 9/2021 | Stacey | H04W 88/10 |
| 2022/0116192 | A1 * | 4/2022 | Noh | H04L 5/0091 |
| 2022/0287122 | A1 * | 9/2022 | Wang | H04W 8/22 |
| 2023/0053972 | A1 * | 2/2023 | Patil | H04W 76/15 |

(Continued)

*Primary Examiner* — Nicholas Sloms
(74) *Attorney, Agent, or Firm* — Hewlett Packard Enterprise Patent Department

(57) ABSTRACT

In implementations of the present disclosure, there is provided an approach for transmitting a broadcast frame (BC) or a multicast (MC) frame. A method comprises obtaining a BC frame or an MC frame. Moreover, multiple links used by an access point (AP) multi-link device (MLD) are determined. Then, a master link is selected from the multiple links based on the usage condition of the multiple links. The BC frame or the MC frame is converted to a unicast frame for the master link. Next, the unicast frame is transmitted to a station MLD of the set of stations by using the master link. Implementations of the present disclosure can reduce a waste of time for a station MLD, a waste of channel resources, and serious issues for dynamic multicast optimization on the station side.

18 Claims, 8 Drawing Sheets

(56) References Cited

U.S. PATENT DOCUMENTS

| | | | | |
|---|---|---|---|---|
| 2023/0110142 | A1* | 4/2023 | Gan | H04W 4/06<br>370/312 |
| 2023/0119901 | A1* | 4/2023 | Viger | H04W 76/15<br>370/329 |
| 2024/0090057 | A1* | 3/2024 | Yoshikawa | H04L 5/0048 |
| 2024/0205995 | A1* | 6/2024 | Chu | H04W 76/15 |

* cited by examiner

RELIABLE FRAME TRANSMISSION SCHEME FOR MULTI-LINK DEVICE

BACKGROUND

A multi-link operation (MLO) is one major medium access control (MAC) feature introduced in Wi-Fi 7. It enables devices to exchange frames over multiple links. MLO enables a non-access point (AP) multi-link device (MLD) to discover, authenticate, associate, and set up multiple links with an AP MLD. Each link enables channel access and frame exchanges between the non-AP MLD and the AP MLD based on the supported capability exchanged during association.

In networking and telecommunications, a broadcast (BC) frame or a multicast (MC) frame refers to a type of data frame used in network communication protocols to efficiently transmit data to multiple recipients simultaneously. This is often used in situations where the same information needs to be sent to multiple destinations, such as broadcasting data to all devices on a network or multicasting data to specific groups of devices. The AP MLD may transmit a BC frame or an MC frame to the non-AP MLD.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
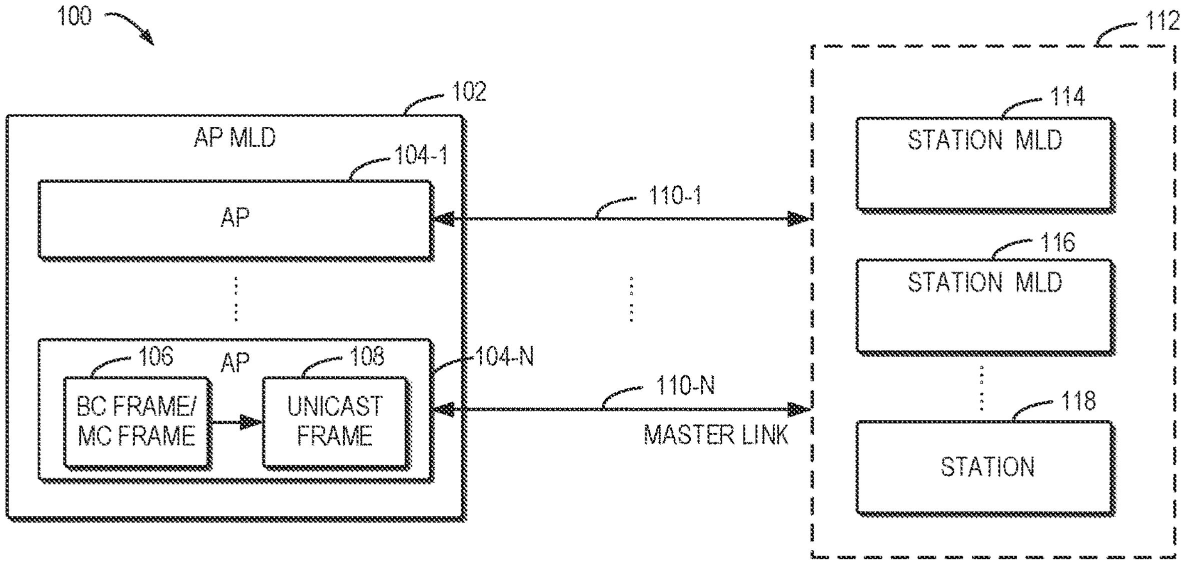
FIG. 1 illustrates a block diagram of an example environment in which reference implementations of the present disclosure may be implemented.

As discussed above, the AP MLD may transmit a BC frame or an MC frame to the non-AP MLD. BC frames or MC frames are sent at delivery traffic indication map (DTIM) time if stations connected to the AP MLD go to power save state. The AP MLD will send them on each link with the same sequence number because each link may have non-MLD stations. In this case, there are many problems.

For example, a station MLD will receive multiple (equal to MLO link number) identical BC frames or MC frames. This is a waste of time for station MLD as well as a waste of channel resources when having many more station MLDs than non-MLD stations. Furthermore, traditional dynamic multicast optimization (DMO, this feature will convert the multicast stream to unicast steam dynamically) is no longer suitable for Wi-Fi 7 MLD. If multicast frames are forwarded to unicast frames for each station on all links, the station MLD will receive multiple unicast frames with the same content from different links, which may cause serious issues on the station side and higher channel utilization.

Further, transmitting a BC frame or an MC frame requires meeting some latency defects and security issues, since the group temporal keys (GTKs) are different among MLD links, and the key encryption type needs to be compatible with the lowest stations connected with the same basic service set (BSS), then any GTK updating procedure or security compatible issue will affect the BC/MC reliability.

Therefore, implementations of the present disclosure propose a solution for transmitting a broadcast frame or a multicast frame to station MLD devices reliably. According to implementations of the present disclosure, an AP MLD obtains a BC frame or an MC frame. The AP MLD also determines multiple links used by the AP MLD, wherein the multiple links are linked between the AP MLD and a set of stations, including station MLDs. Then, the AP MLD selects a master link from the multiple links based on the usage condition of the multiple links, and the AP MLD further converts the obtained BC frame or the obtained MC frame to a unicast frame for the master link. Then, the AP MLD uses the master link to transmit the unicast frame to a station MLD of the set of stations.

The AP MLD may transmit the BC frame or the MC frame via the master link by converting the BC frame or the MC frame to the unicast frame and discarding the BC frame or the MC frame on other links. Therefore, the station MLD receives a unicast frame corresponding to one BC frame or one MC frame, rather than receiving multiple identical BC frames or MC frames, or multiple unicast frames with the same content from different links. Therefore, this operation avoids a waste of time for STA MLD to transmit and receive, as well as a waste of channel resources when having many more MLD STAs than non-MLD STAs. This operation also avoids causing serious issues on the station side and higher channel utilization.

Other advantages of implementations of the present disclosure will be described with reference to the reference implementation as described below. Reference is made below to FIG. 1 through FIG. 8 to illustrate basic principles and several reference implementations of the present disclosure herein.

FIG. 1 shows a block diagram of an example environment in which reference implementations of the present disclosure may be implemented. In the example environment 100 of FIG. 1, an AP MLD 102 communicates with a set of stations 112 over multiple links, for example, a link 110-1, . . . , a link 110-N, where N is an integer. The AP MLD 102 includes multiple APs, for example, an AP 104-1, . . . , an AP 104-N, each of which establishes a link to connect to some stations in the set of stations 112 including station MLDs and/or legacy stations without MLO capacities.

In some implementations, the multiple links may be two links. For example, one link relates to 2.4 GHZ, and the other link relates to 5 GHZ. Therefore, the AP MLD 102 may communicate with the station MLD via the 2.4 GH link and the 5 GHz link. Additionally, some legacy stations may communicate with the AP MLD 102 via the 2.4 GH link or the 5 GHz link. In some implementations, the multiple links may be three links. For example, a first link relates to 2.4 GHZ, a second link relates to 5 GHz, and a third link relates to 6 GHz. Therefore, the station MLD may communicate with the AP MLD 102 via two or three links of the 2.4 GH link, the 5 GHz link, and the 6G Hz link. Additionally, some legacy stations may communicate with the AP MLD 102 via the 2.4 GH link, the 5 GHz link, or the 6 GHz link.

The set of stations 112 includes a station MLD 114, a station MLD 116, and a station 118. The station MLD 114 and the station MLD 116 can communicate with AP MLD through a plurality of links. The plurality of links may be a part of the multiple links or all of the multiple links. The station 118 is a legacy station and does not have MLO capacity, so it communicates with AP MLD 102 through one link of the multiple links.

In implementations of the present disclosure, the DMO can be used by the AP MLD to transmit the BC frame or the MC frame to the set of stations. When the DMO is used, the BC frame or the MC frame will be converted into a unicast frame. If the AP MLD 102 determines to transmit a BC frame or an MC frame by the DMO, in order to avoid the station MLDs receiving multiple unicast frames with the same content from different links, a master link is selected from multiple links. The selection of the master link will be described with reference to FIG. 2 and FIG. 3. If the DMO is used by the AP MLD 102, the selected master link is used to transmit the BC frame or MC frame 106, and the AP MLD 102 will discard the BC frame or an MC frame on other links. As shown in FIG. 1, the link 110-N is selected as the master link. Therefore, the BC frame or the MC frame 106 is transmitted by the AP 104-N corresponding to the master link 110-N.

During the transmitting, the AP 104-N converts the BC frame or MC frame 106 to a unicast frame 108. Then, the unicast frame 108 is transmitted to the set of stations 112 over the master link 110-N. The other links will not transmit the BC frame or MC frame. In this case, the station MLD communicated with the AP MLD 102 may receive the unicast frame generated from the BC frame or MC frame only from the master link, and would not receive multiple unicast frames generated from the BC frame or MC frame from the other links, which avoids a waste of time for a station MLD about transmitting and receiving, as well as a waste of channel resources. For the station MLD or the legacy station, which is not connected to the master link, the AP MLD 102 may transmit the BC frame or MC frame to the station MLD or the non-MLD station over other links. For example, the AP MLD 102 may convert the BC frame or MC frame to a unicast frame, and transmit the unicast frame to the station MLD or the non-MLD station, which are not connected to the master link over other links.

As discussed above, when the DMO is used by the AP MLD to transmit a BC frame or an MC frame, the master link is required to be selected and used to transmit the BC frame or the MC frame in an efficient and reliable way. The proper master link for an MLD and non-MLD fixed network topology may be dynamically selected. For a station MLD which has multiple links connected to an AP MLD, the AP MLD should only select one link to do DMO for the station MLD, and discard the BC frame or the MC frame on other links.

The above describes that the AP MLD 102 may use the DMO to transmit the BC frame or MC frame. Moreover, the AP MLD 102 may transmit BC frames or MC frames with the same content over multiple links in traditional mode. The multiple links have different delivery traffic indication message (DTIM) periods. For example, the DTIM period of link 1 is 2, and the DTIM period of link 2 is 3. The station MLD may be a multi-link single radio (MLSR) type. Therefore, the MLST station MLD may switch among different links. In this case, if the MLST station MLD switches to other links before the DTIM time of the current link, the MLST station MLD may lose the BC frame or the MC frames. In order to avoid the loss of the BC frame or the MC frame by the station MLD of the MLSR type, the AP MLD 102 may determine a least common multiple of multiple DTIM periods for the multiple links as an aligned DTIM period; and transmit the BC frame or the MC frame at the aligned DTIM period.

In some implementations, in order to ensure the security of the BC frame or the MC frame, the AP MLD 102 may encrypt the BC frame or the MC frame for the station MLD and non-MLD station using different group keys. In some implementations, in order to guarantee the reliability of the BC frame or the MC frame, on-channel tunneling (OCT) operation can be used by the AP MLD 102 and the station MLD. In this case, the multiple BC frames or MC frames for multiple links can be transmitted by one link of the multiple links, and the multiple BC frames or MC frames are decrypted by different group keys for different links.

Figure 2:
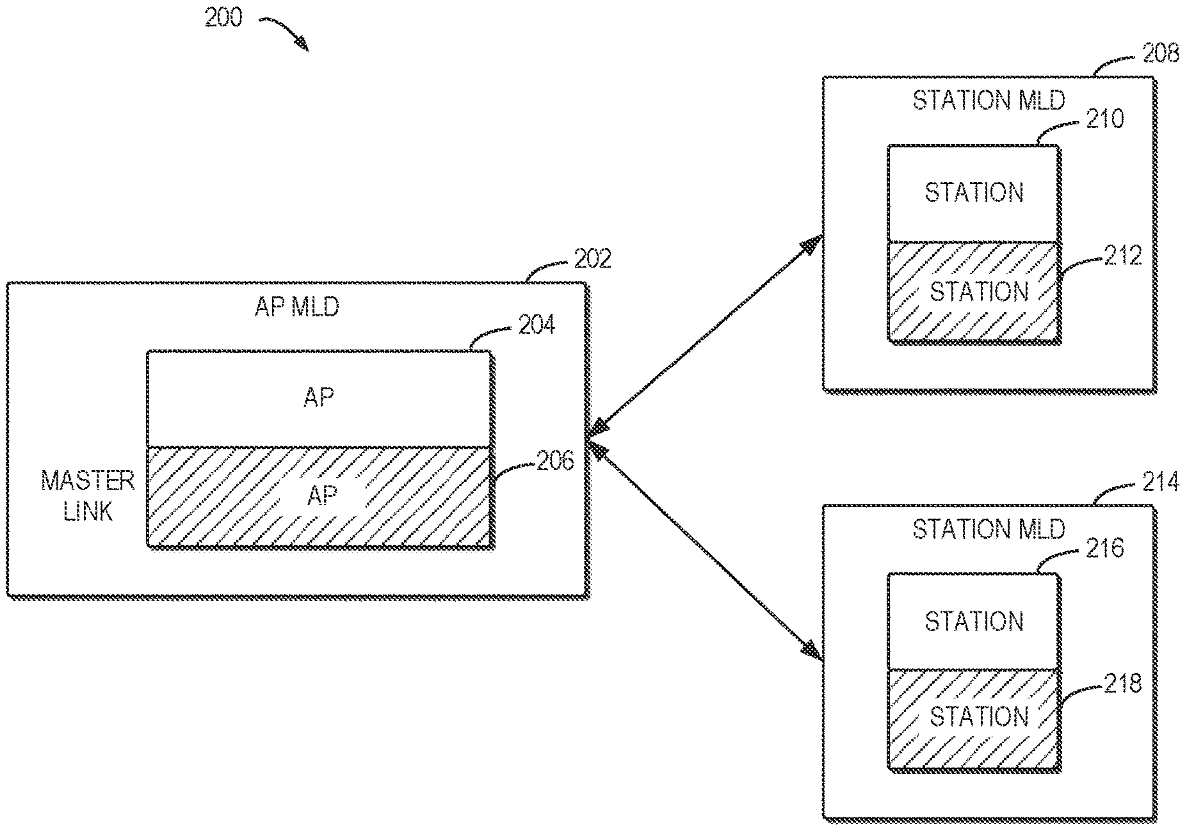
FIG. 2 illustrates an example of a selection of a master link according to implementations of the present disclosure.

For example, FIG. 2 illustrates an example 200 of the selection of a master link according to implementations of the present disclosure. In FIG. 2, there is an AP MLD 202, which has two APs, and two station MLDs 208 and 214, which each include two stations. The AP MLD 202 communicates with the station MLD 208 and the station MLD 214 over two links. For example, an AP 204 in the AP MLD 202 communicates with a station 210 in station MLD 208 and a station 216 in the station MLD 214 over the first link, and an AP 206 in the AP MLD 202 communicates with a station 212 in the station MLD 208 and a station 218 in the station MLD 214 over the second link. When the AP MLD 202 and the station MLDs 108 and 214 perform the DMO, one link is selected as the master link.

The selection of the master link is based on the usage condition of the multiple links. In some implementations, the selection of the master link is based on the processing capacity of the AP corresponding to the link. For example, the strongest CPU may perform the DMO quickly. Therefore, the link corresponding to an AP having the strongest CPU is used as the master link. As shown in FIG. 2, the processing capacity of the AP 206 is stronger than that of the AP 204. Therefore, the link of the AP 206 is selected to do the DMO, and vice versa.

In some implementations, the selection of the master link is based on the health status of the link. For example, the healthiest link is selected as the master link to do the DMO. The health status of a link relates to channel utilization, noise floor (NF), transmission, and other factors. Therefore, the healthiest link can be selected based on the above factors. For example, as shown in FIG. 2, if the health status of the link of the AP 206 is better than that of the AP 204, the link of the AP 206 is used as the master link to do the DMO, and vice versa.

In some implementations, when the AP MLD selects the master link, both the processing capacity of the AP corresponding the link and the health status of the link are considered. For example, the healthiest link corresponding to the strongest CPU is used as the master link. In some implementations, the selection of the master link may be based on the number of traffic and air quality for one link. The above examples are used to describe this disclosure, rather than the limitation to the disclosure.

Figure 3:
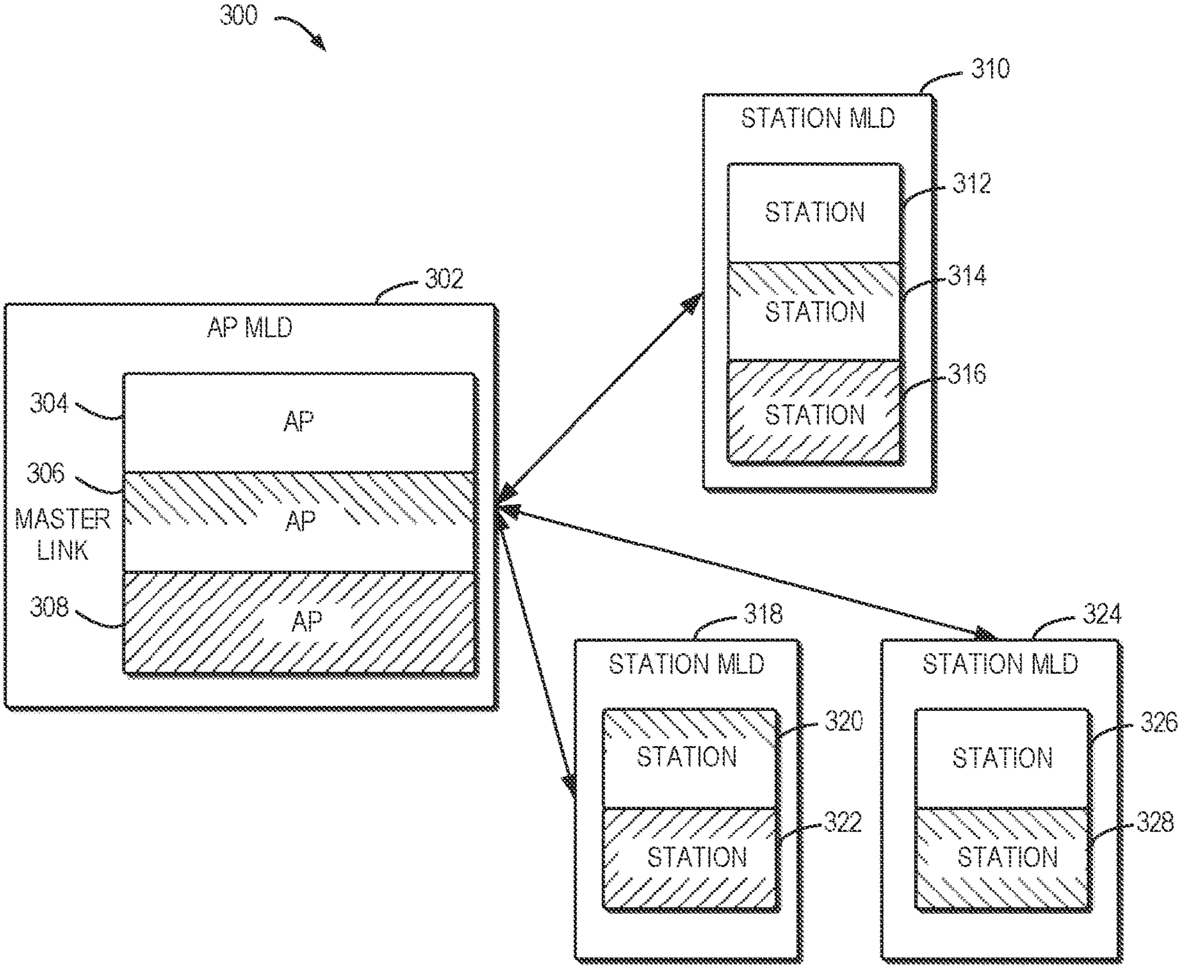
FIG. 3 illustrates another example of a selection of a master link according to implementations of the present disclosure.

Moreover, the common link among all station MLDs may be selected as the master link. For example, the AP may determine a number of station MLDs connected to each of the multiple links; and then select the master link from the multiple links based on the number of the station MLDs. For example, the link with the maximum number of the station MLDs is used as the master link. FIG. 3 illustrates another example 300 of the selection of a master link according to implementations of the present disclosure. In FIG. 3, AP 302 has three APs, for example, an AP 304, an AP 306, and an AP 308, and the three AP has three links. As shown in FIG. 3, a station MLD 310 has three stations 312, 314, and 316, a station MLD 318 has two stations 320 and 322, and a station MLD 324 has two stations 326 and 328. The AP 304 in the AP MLD 302 communicates with the station 312 in the station MLD 310 and the station 326 in the station MLD 324 over the first link. The AP 306 in the AP MLD 302 communicates with the station 314 in the station MLD 310, the station 320 in the station MLD 318, and the station 328 in the station MLD 324 over the second link. The AP 308 in the AP MLD 302 communicates with the station 316 in the station MLD 310 and the station 322 in the station MLD 318 over the third link. The number of station MLDs connected to the second link is 3, and the number of station MLDs connected to the first link or the third link is 2. Therefore, the number of station MLDs connected to the second link is the maximum number. The second link relates to the AP 306 is used as the master link.

In some cases, the station MLD of the Multi-Link Single Radio (MLSR) type may lose BC/MC frames. For example, when the MLST station MLD switches between different links, if the switch makes the MLST station MLD avoid the DTIM time, the MLST station MLD may lose the BC/MC frames. In order to avoid the above situation, the DTIM times for transmitting the BC/MC frames over multiple links may be aligned. Moreover, the beacon TBTT of each link may be aligned. The corresponding DTIM periods of link 1, . . . , and link n are D1, . . . , and Dn. An aligned DTIM period for transmitting the BC/MC frames is defined as the least common multiple of each link DTIM period. For example, the aligned DTIM period is the least common multiple of D1, . . . , Dn. After the aligned DTIM period is determined, the AP transmits the BC/MC frames at the Aligned DTIM time. In this case, no matter which link of the multiple links the MLST station MLD switches to, it will receive the BC/MC frames at the aligned DTIM time.

Figure 4:
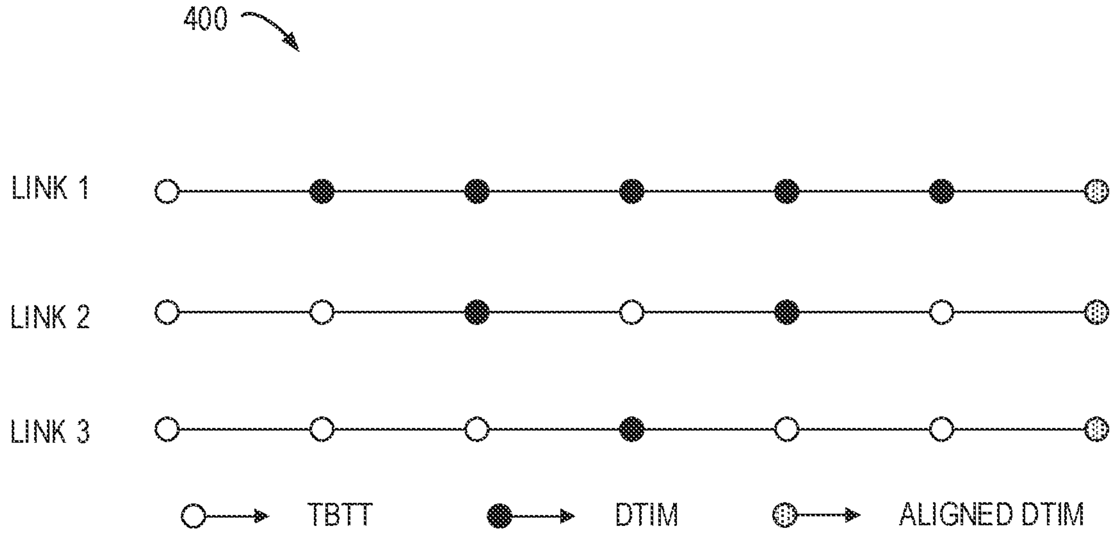
FIG. 4 illustrates an example of transmitting a BC frame or MC frame according to implementations of the present disclosure.

FIG. 4 illustrates an example 400 for transmitting a BC frame or an MC frame according to implementations of the present disclosure. In FIG. 4, an AP MLD communicates with a set of stations including station MLDs over three links, for example, a link 1, a link 2, and a link 3. The beacon TBTT of each link may be aligned. The DTIM period of link1 is 1, the DTIM period of link 2 is 2, and the DTIM period of link 3 is 3. The least common multiple of the three link DTIM periods is 6. Therefore, the aligned DTIM period is 6. The AP MLD may transmit the BC/MC frames at the aligned DTIM time. In this case, the MLST station MLD may receive a BC frame or an MC frame regardless of the switching operation of the MLST station MLD.

In this disclosure, the security issue for the BC frame or the MC frame is also resolved. The BC/MC key has some defects and security issues since the BC/MC frame must send with a basic rate, and the key encryption type needs compatible with the lowest stations connected with the same basic service set (BSS), which means even AP BSS has extremely high throughput (EHT, also referred as 11be Wi-Fi 7) capability, its unicast key can encrypt with Wi-Fi Protected Access 3 (WPA3, it's an encryption mode), but its BC/MC key still can be wired equivalent privacy (WEP, it's an encryption mode) with Rivest Cipher 4 (RC4). In order to avoid the above issue, the AP BSS distributes two group keys for MLD stations and legacy stations without the MLO.

In this disclosure, group keys are separated by MLD stations and legacy stations, called MLD group key and legacy group key. The group key is generated with a random value in HOSTAPD (it's a user space daemon for access point and authentication servers) and will be sent from AP to a station in extensible authentication protocol over local area networks (EAPOL) 3 (the 3 means the 3rd EAPOL frame in the key exchange process) frame. Two group keys are generated based on the peer client and whether it has an EHT element. If the station does not have EHT capacity, the process generates a legacy group key per radio, and if the station has EHT capacity, it will generate an MLD group key with AES_GCM_256 to keep the group key with high security and fast speed when sending a BC frame or an MC frame across MLD links, and this MLD group key will share with all MLD links. The BC frame or the MC frame may be sent in one of the MLD links with robust encryption and high speed.

Next, these two-group keys will be set to driver, and when the BC frame or the MC frame comes from the upper application and is sent to driver, the driver will encrypt the BC frame or the MC frame with the legacy group key and the MLD group key separately, and send it to the radio interface. The driver will select one of the MLD links as the master link, as discussed above, and then use the selected master link to send the encrypted BC frame or MC frame.

The driver will send two copies of the BC frame or MC frame (since in driver side, its EHT or non-EHT cannot be figured out because the driver will use group keys when the destination address (DA) mac address indicates the BC/MC), but for MLD, all MLD links share one group key. One of the MLD links may be selected as the master link to send the BC/MC frame with the highest rate and the group key encryption to improve the MLD BC/MC reliability.

Moreover, this disclosure may leverage on-channel tunneling (OCT) operations to guarantee BC/MC traffic among MLD links. The BC/MC keys are different among MLD links; for example, the group temporal key (GTK) and the GTK updating processes among MLD links are dynamic, so inconsistent states may occur for a period of time during MLD GTK updating. The MLD active link might fail to decode the BC/MC frames with its own old GTK (sometimes, the active link could be the master link, and re-association might introduce traffic latency), thus the MLD OCT for BC/MC among MLD links are used.

Figure 5A:
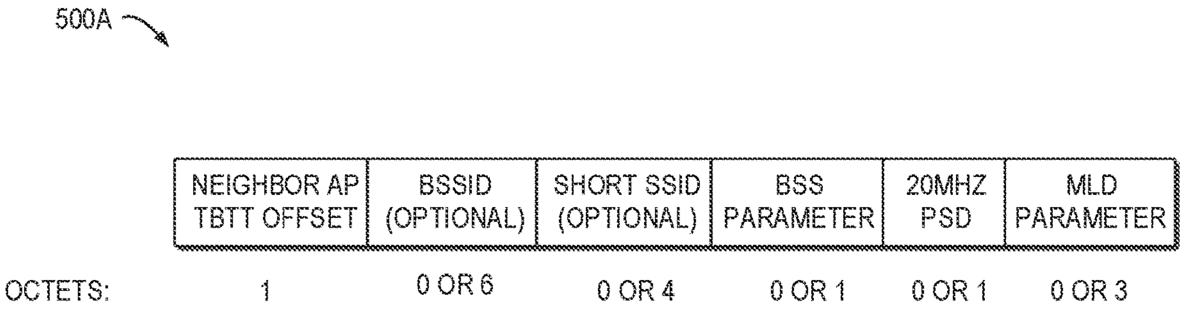
FIG. 5A illustrates an example of target beacon transmission time (TBTT) information filed format according to implementations of the present disclosure.
Figure 5B:
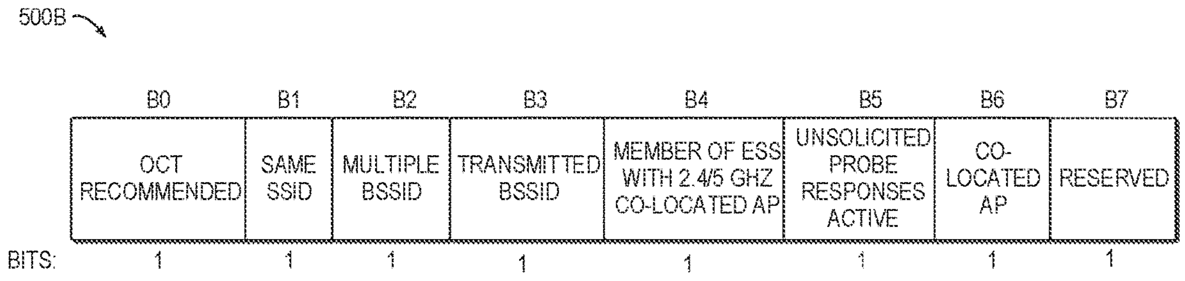
FIG. 5B illustrates an example of BSS parameters subfield format according to implementations of the present disclosure.
Figure 5C:
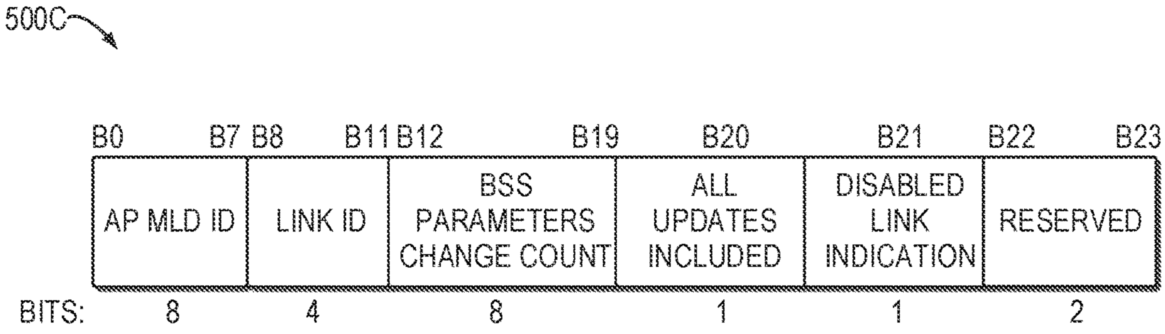
FIG. 5C illustrates an example of MLD parameters subfield format according to implementations of the present disclosure.

In order to use the MLD OCT, the OCT recommended subfield required to be set. FIG. 5A illustrates an example 500A of TBTT information filed format according to implementations of the present disclosure. As shown in FIG. 5A, the TBTT information filed includes BSS parameters subfield. FIG. 5B illustrates an example 500B of BSS parameters subfield format according to implementations of the present disclosure. As shown in FIG. 5B, the BSS parameters subfield includes the OCT recommended subfield. Therefore, the OCT recommended subfield equals 1 in at least one TBTT info for MLD links that are affiliated to the same AP MLD in a reduced neighbor report (RNR) Information Element (IE). For example, for one MLD X with three MLD links 1, 2, 3, the transmit (TX) beacon frame on 2.4G link 1 carries the RNR IE with the OCT support on 5G link 2 and 6G link 3, the TX beacon frame on 5G link 2 carries the RNR IE with the OCT support on 2.4G link 1 and 6G link 3, and the TX beacon frame on 6G link 3 carries the RNR IE with the OCT support on 2.4G link 1 and 5G link 2. Moreover, the TBTT information filed also includes MLD parameters subfield. FIG. 5C illustrates an example 500C of MLD parameters subfield format according to implementations of the present disclosure. The MLD parameters subfield includes AP MLD identifier (ID), link ID, etc.

Figure 6:
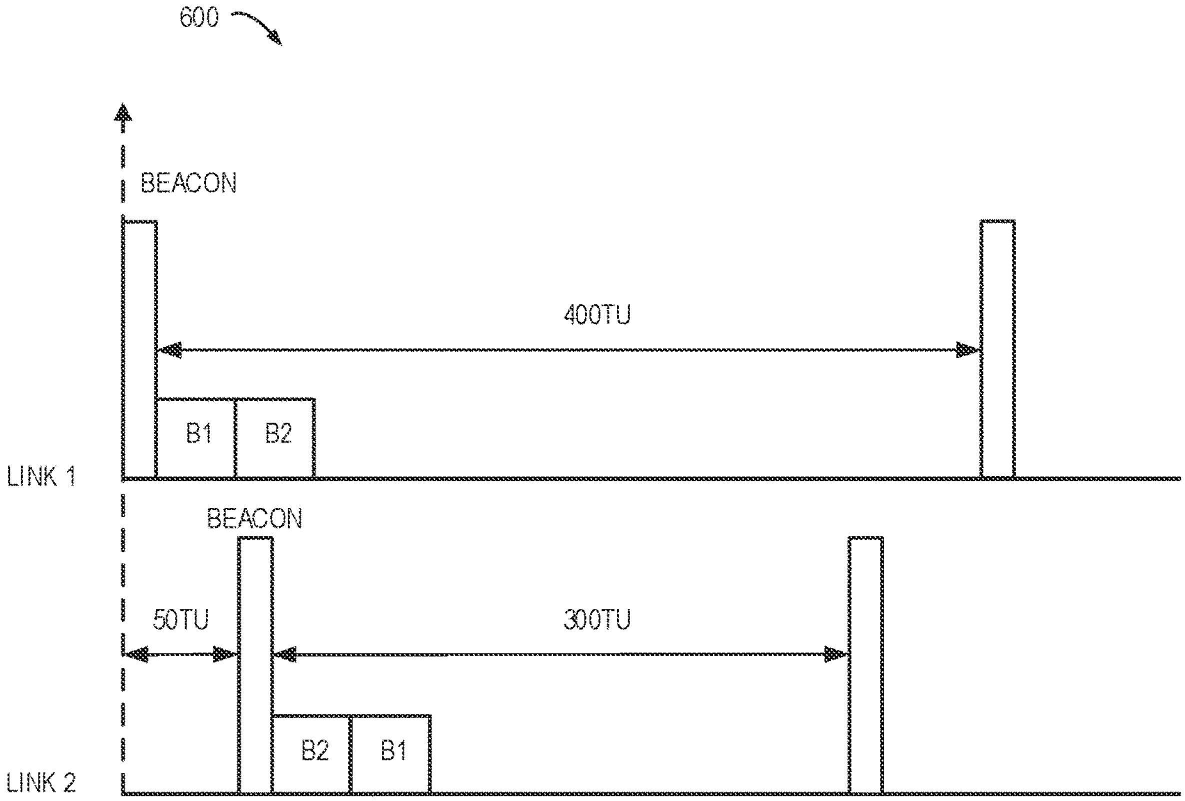
FIG. 6 illustrates an example of transmitting a BC frame or an MC frame according to implementations of the present disclosure.

FIG. 6 illustrates an example 600 for transmitting a BC frame or an MC frame according to implementations of the present disclosure. In FIG. 6, the AP may broadcast the OCT capability in RNR IE for beacon frames in link1 and/or link 2. Then, the AP multicast listener discovery (MLD) local media access control address (LMAC) link 1 will send out a first BC frame or MC frame B1 encrypted with Key-B1 (GTK 1). Then, AP MLD LMAC link 2 will forward a second BC frame or MC frame B2 encrypted with Key-B2 (GTK 2) through internal AP MLD unified media access control (UMAC) to link 1. The AP MLD LMAC link 1 will send out B2 encrypted with Key-B2 along with the B1. A station MLD then could receive B1 and B2. Next, the station MLD LMAC link 1 then could receive B1 and B2, and decrypt the B1 with Key-B1 on the station MLD LMAC link 1. The station MLD LMAC link 1 forwards the B2 internally through the station MLD UMAC to link 2. The station MLD LMAC link 2 will decrypt B2 with Key-B2. By using OCT, a single MAC protocol data unit (MPDU) can be transmitted in one OCT action frame, and the MPDU of one band can be transmitted on another band through OCT. In this disclosure, the OCT is leveraged to carry BC/MC frames. Moreover, as shown in FIG. 6, the AP MLD LMAC link 2 may transmit B2 and B1 in similar way.

Figure 7:
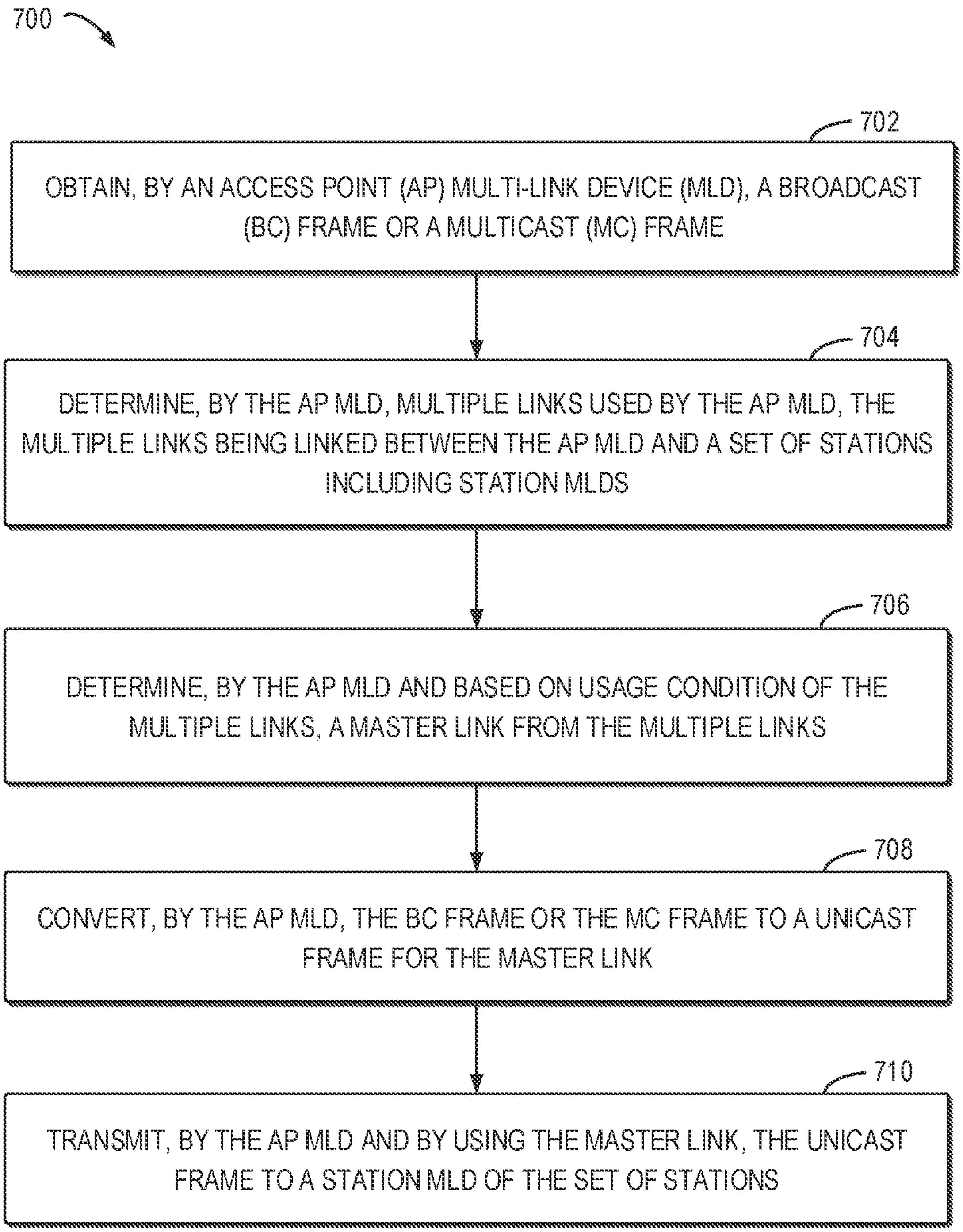
FIG. 7 illustrates a flow chart of an example method for transmitting a broadcast frame or a multicast frame according to implementations of the present disclosure.

FIG. 7 illustrates a flow chart of an example method for transmitting a broadcast frame or a multicast frame according to implementations of the present disclosure, and the method 700 is performed by an AP MLD. At 702, the AP MLD obtains a broadcast (BC) frame or a multicast (MC) frame. For example, the AP MLD 102 may generate a BC frame or an MC frame. The BC frame is used to send data to all devices in a network segment. The multicast frame is used to send data to a specific group of devices in a network segment. For BC frames or MC frames, they are sent at DTIM time if some stations go to power save state.

At 704, the AP MLD determines multiple links used by the AP MLD, the multiple links being linked between the AP MLD and a set of stations, including station MLDs. For example, the AP MLD 102 determines that there are multiple links between the AP MLD 102 and the set of stations 112. In some implementations, the AP MLD may communicate with the set of stations 112 over two links; for example, a link 1 relates to 2.4 GHz and a link 2 relates to 5 GHZ. In some implementations, the AP MLD may communicate with the set of stations over three links. For example, a link 1 relates to 2.4 GHZ, a link 2 relates to 5 GHZ, and a link 3 relates to 6 GHZ. The AP MLD 202 may determine the multiple links based on the AP included in the AP MLD.

At 706, the AP MLD determines, based on the usage condition of the multiple links, a master link from the multiple links. For example, the AP MLD 102 selects a master link 110-N from multiple links according to the usage condition of the multiple links. In some implementations, the usage condition of the multiple links includes the processing capacities of APs in the AP MLD corresponding to the multiple links. For example, the CPU may be used to represent the processing capacity. Therefore, the link corresponding to the AP having the strongest CPU is used as the mater link. In some implementations, the usage condition of the multiple links includes the healthy statuses of the multiple links. Therefore, the healthy statuses of the multiple links can be used to select the master link. For example, the healthiest link is selected as the master link. The healthy statuses of the multiple links may be determined by using the channel utilization, NF, retransmission, and other factors. Moreover, the usage condition of the multiple links may include processing capacities of APs in the AP MLD corresponding to the multiple links and the healthy statuses of the multiple links. Therefore, the master link may be selected based on the processing capacities of APs in the AP MLD corresponding to the multiple links and the healthy statuses of the multiple links. Moreover, the usage condition of the multiple links may include the number of traffic on each link and the air quality of each link.

At 708, the AP MLD converts the BC frame or the MC frame to a unicast frame for the master link. For example, after the AP MLD 102 obtains the BC frame and the MC frame, and selects the main link from the multiple links, the AP 104-N in the AP MLD 102 corresponding to the master link is used to covert the BC frame or the MC frame 106 to a unicast frame 108.

At 710, the AP MLD transmitting, by using the master link, the unicast frame to a station MLD of the set of stations. As an example, after the AP 104-N in the AP MLD 102 generates the unicast frame, the AP MLD 102 transmits the unicast frame to the set of stations 112. The station MLDs or non-MLD stations connecting to the master link will receive the unicast frame through the master link. The AP MLD will discard the BC frame or the MC frame on other links. Therefore, the station MLDs only receives the BC frame or the MC frame on the main link.

In this way, the AP MLD can use the selected master link to transmit the BC frame or the MC frame and do not use the other links to transmit the BC frame or the MC frame. Therefore, the station MLD will not receive multiple identical BC frames or MC frames. Thereby, it avoids a waste of time for STA MLD as well as a waste of channel resources when having many more MLD STAs than non-MLD stations. Moreover, in this way, the DMO is suitable for Wi-Fi 7 MLD, and the DMO may be used by the AP MLD without causing serious issues on the station side.

Moreover, the AP MLD may transmit a BC frame or an MC frame via each of the multiple links. A station MLD of the set of stations may be multi-link single radio (MLSR) type. It means that the station MLD may switch between the multiple links. In this case, the station MLD may lose a BC frame or an MC frame. In order to avoid this situation, the AP MLD may determine a least common multiple of multiple delivery traffic indication message (DTIM) periods for the multiple links as an aligned DTIM period; and transmit the BC frame or the MC frame at the aligned DTIM time.

Additionally, transmitting a BC frame or an MC frame requires meeting some latency defects and security issues since the GTKs are different among MLD links, and the key encryption type needs to be compatible with the lowest station connected with the same BSS. Therefore, the security-compatible issue will affect the BC/MC reliability. In order to ensure the security of the BC frame or the MC frame, the AP MLD 102 may transmit the BC frame or the MC frame for the station MLD and Non-MLD station using different group keys. For example, if a station of the set of stations lacks ETH capacity, the legacy group key is assigned to the station. If a station of the set of stations has ETH capacity, the MLD group key is assigned to the second station.

In some implementations, in order to guarantee the reliability of the BC frame or MC frame, on-channel tunneling (OCT) operation is used by the AP MLD and the station MLD. In this case, the multiple BC frames or MC frames for multiple links are encrypted by using respective group keys and are transmitted to the station MLD via one link of the multiple links. The multiple BC frames or MC frames are decrypted by different keys for different links in the station MLD.

Figure 8:
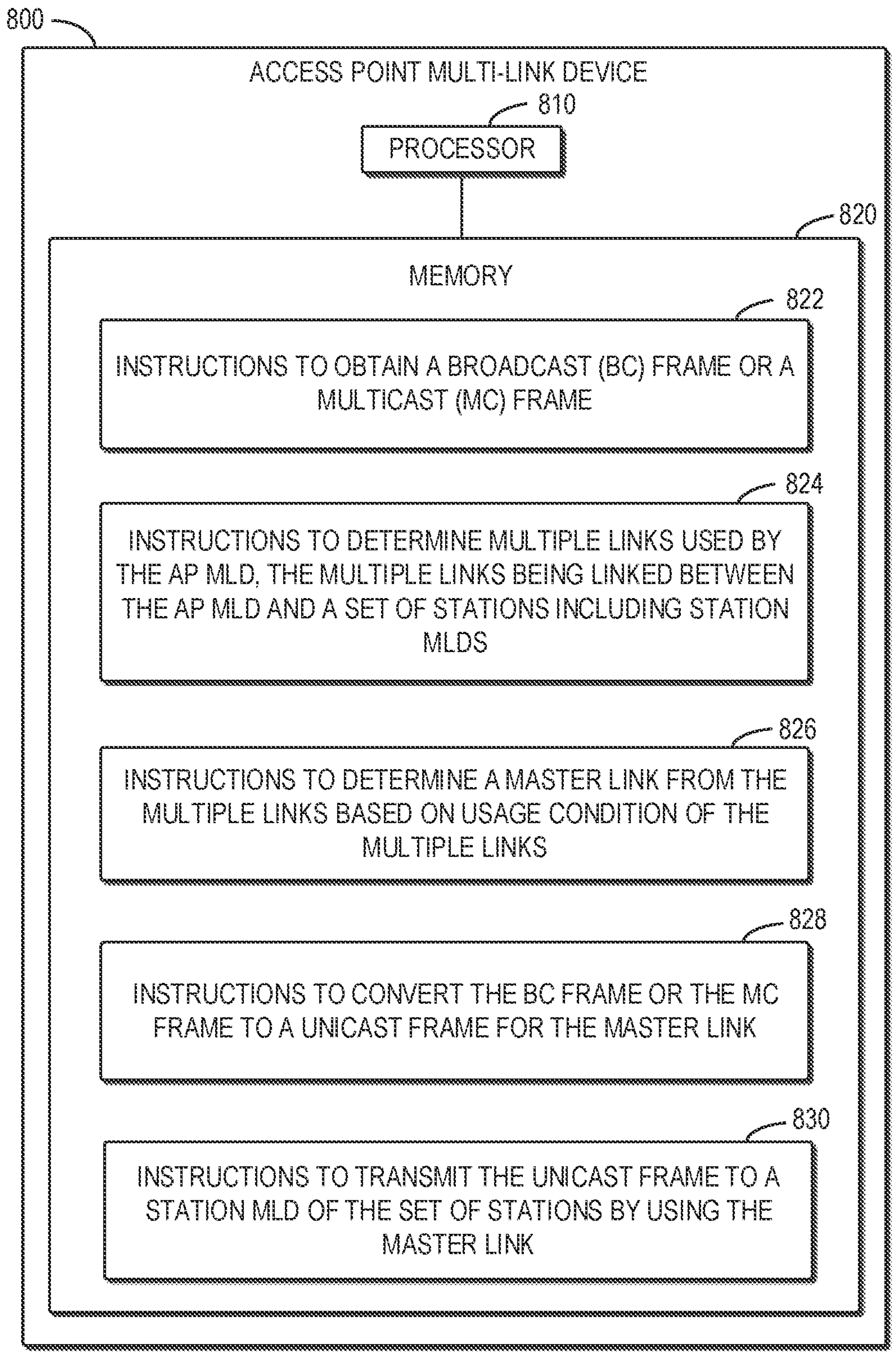
FIG. 8 illustrates an example access point multi-link device according to implementations of the present disclosure.

FIG. 8 illustrates an example AP MLD 800 according to implementations of the present disclosure. As shown in FIG. 8, the AP MLD 800 comprises at least one processor 810, and a memory 820 coupled to the processor 810. The memory 820 stores instructions 822, 824, 826, 828, and 830 to cause the processor 810 to perform actions according to reference implementations of the present disclosure.

As shown in FIG. 8, the memory 820 stores instructions 822 to obtain a broadcast (BC) frame or a multicast (MC) frame. The memory 820 further stores instructions 824 to determine multiple links used by the AP MLD, the multiple links being linked between the AP MLD and a set of stations including station MLDs. Moreover, the memory 820 further stores instructions 826 to determine a master link from the multiple links based on the usage condition of the multiple links. As an example, the master link may be selected based on one of the processing capacity, the healthy status, the number of traffic, or air quality. The memory 820 further stores instructions 828 to convert the BC frame or the MC frame to a unicast frame for the master link. As shown in FIG. 8, the memory 820 further stores instructions 830 to transmit the unicast frame to a station MLD of the set of stations by using the master link.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that from a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:

obtaining, by an access point (AP) multi-link device (MLD), a first broadcast (BC) frame, or a first multicast (MC) frame;

determining, by the AP MLD, multiple links used by the AP MLD, the multiple links being linked between the AP MLD and a set of stations including station MLDs;

determining, by the AP MLD and based on usage condition of the multiple links, a master link from the multiple links;

converting, by the AP MLD, the first BC frame or the first MC frame to a unicast frame for the master link;

transmitting, by the AP MLD and by using the master link, the unicast frame to a station MLD of the set of stations;

determining that a second BC frame or a second MC frame is to be transmitted on the multiple links;

determining an aligned delivery traffic indication message (DTIM) period based on multiple DTIM periods for the multiple links; and transmitting the second BC frame or the second MC frame with the aligned DTIM period.

2. The method according to claim 1, wherein determining the master link from the multiple links comprises:

selecting the master link from the multiple links based on at least one of processing capacities of multiple APs in the AP MLD corresponding to the multiple links, or healthy statuses of the multiple links.

3. The method according to claim 1, wherein determining the master link from the multiple links comprises:

determining a number of station MLDs of the set of stations connected to each of the multiple links; and determining the master link based on the number of the station MLDs.

4. The method according to claim 1, further comprising:

generating a first encrypted BC frame or a first encrypted MC frame by encrypting a third BC frame or a third MC frame with a first group key, the first group key relating to a station without extremely high throughput (EHT) capacity;

generating a second encrypted BC frame or a second encrypted MC frame by encrypting the third BC frame or the third MC frame with a second group key, the second group key being different from the first group key and relating to a station with ETH capacity; and transmitting the first encrypted BC frame or a first encrypted MC frame and the second encrypted BC frame or the second encrypted MC frame over the master link.

5. The method according to claim 4, wherein the second group key is used across the multiple links.

6. The method according to claim 4, further comprising:

determining that a first station of the set of stations lacks ETH capacity;

assigning the first group key to the first station;

determining that a second station of the set of stations has ETH capacity; and assigning the second group key to the second station.

7. The method according to claim 4, further comprising:

broadcasting on-channel tunneling (OCT) capability in beacon frames on the multiple links;

encrypting a fourth BC frame or a fourth MC frame with a third group key corresponding a first link of the multiple links; and forwarding the encrypted fourth BC frame or the encrypted fourth MC frame via a second link of the multiple links.

8. The method according to claim 7, further comprising:

encrypting a fifth BC frame or a fifth MC frame with a second group key corresponding the second link; and transmitting the encrypted fifth BC frame or the encrypted fifth MC frame via the second link.

9. An access point (AP) multi-link device (MLD) comprising:

at least one processor;

a memory coupled to the at least one processor, the memory storing instructions to cause the at least one processor to:

obtain a first broadcast (BC) frame or a first multicast (MC) frame;

determine multiple links used by the AP MLD, the multiple links being linked between the AP MLD and a set of stations including station MLDs;

determine a master link from the multiple links based on usage condition of the multiple links;

convert the first BC frame or the first MC frame to a unicast frame for the master link;

transmit the unicast frame to a station MLD of the set of stations by using the master link;

determine that a second BC frame or a second MC frame is to be transmitted on the multiple links;

determine an aligned delivery traffic indication message (DTIM) period based on multiple DTIM periods for the multiple links; and transmit the second BC frame or the second MC frame with the aligned DTIM period.

10. The AP MLD according to claim 9, wherein the instructions to determine the master link from the multiple links comprises instructions to cause the at least one processor to:

select the master link from the multiple links based on at least one of processing capacities of multiple APs in the AP MLD corresponding to the multiple links, or healthy statuses of the multiple links.

11. The AP MLD according to claim 9, wherein the instructions to determine the master link from the multiple links comprises instructions to cause the at least one processor to:

determine a number of station MLDs of the set of stations connected to each of the multiple links; and determine the master link based on the number of the station MLDs.

12. The AP MLD according to claim 9, further comprising instructions to cause the at least one processor to:

generate a first encrypted BC frame or a first encrypted MC frame by encrypting a third BC frame or a third MC frame with a first group key, the first group key relating to a station without extremely high throughput (EHT) capacity;

generate a second encrypted BC frame or a second encrypted MC frame by encrypting the third BC frame or the third MC frame with a second group key, the second group key being different from the first group key and relating to a station with ETH capacity; and transmit the first encrypted BC frame or a first encrypted MC frame and the second encrypted BC frame or the second encrypted MC frame over the master link.

13. The AP MLD according to claim 12, wherein the second group key is used across the multiple links.

14. The AP MLD according to claim 12, further comprising instructions to cause the at least one processor to:

determine that a first station of the set of stations lacks ETH capacity;

assign the first group key to the first station;

determine that a second station of the set of stations has ETH capacity; and assign the second group key to the second station.

15. The AP MLD according to claim 12, further comprising instructions to cause the at least one processor to:

broadcast on-channel tunneling (OCT) capability in beacon frames on the multiple links;

encrypt a fourth BC frame or a fourth MC frame with a third group key corresponding a first link of the multiple links; and forward the encrypted fourth BC frame or the encrypted fourth MC frame via a second link of the multiple links.

16. The AP MLD according to claim 15, further comprising instructions to cause the at least one processor to:

encrypt a fifth BC frame or a fifth MC frame with a second group key corresponding the second link; and transmit the encrypted fifth BC frame or the encrypted fifth MC frame via the second link.

17. A non-transitory computer-readable medium comprising instructions stored thereon which, when executed by an access point (AP) multi-link device (MLD), cause the AP MLD to:

obtain a first broadcast (BC) frame or a first multicast (MC) frame;

determine multiple links used by the AP MLD, the multiple links being linked between the AP MLD and a set of stations including station MLDs;

determine a master link from the multiple links based on usage condition of the multiple links;

convert the first BC frame or the first MC frame to a unicast frame for the master link;

transmit the unicast frame to a station MLD of the set of stations by using the master link;

determine that a second BC frame or a second MC frame is to be transmitted on the multiple links;

determine an aligned delivery traffic indication message (DTIM) period based on multiple DTIM periods for the multiple links; and transmit the second BC frame or the second MC frame with the aligned DTIM period.

18. The non-transitory computer-readable medium according to claim 17, wherein the instructions to determine the master link from the multiple links comprises instructions to cause the AP MLD to:

select the master link from the multiple links based on at least one of processing capacities of multiple APs in the AP MLD corresponding to the multiple links, or healthy statuses of the multiple links.

* * * * *